July 4, 1944.     D. J. JORDAN     2,352,790
AIR INTAKE SCOOP
Filed March 29, 1941
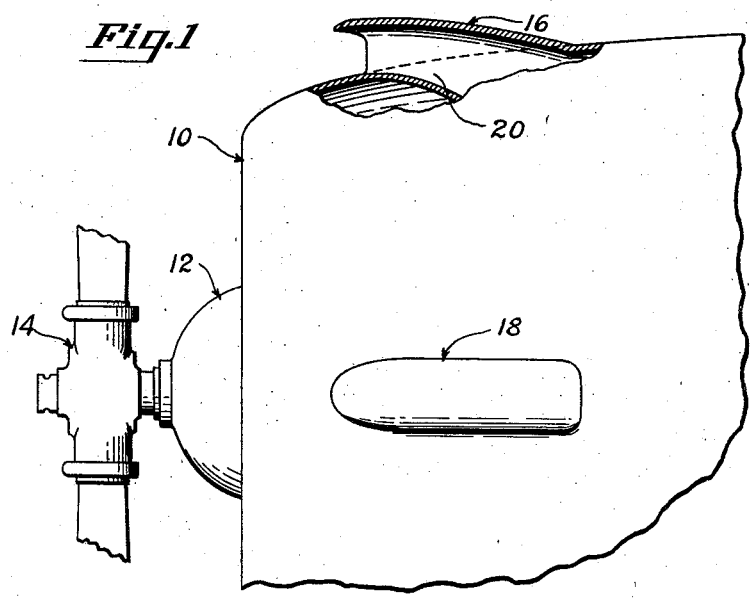
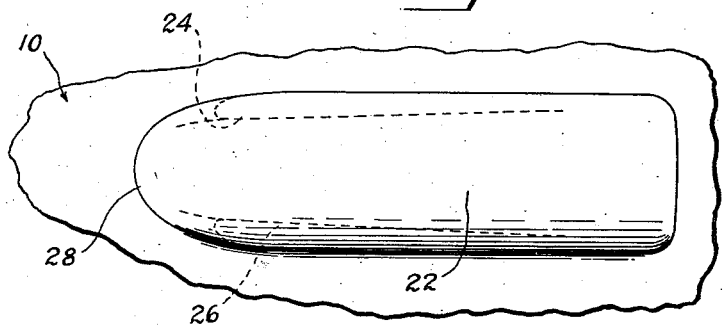
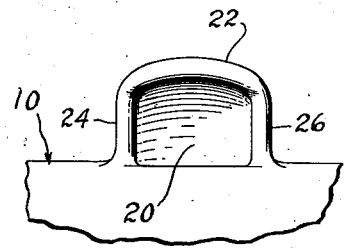
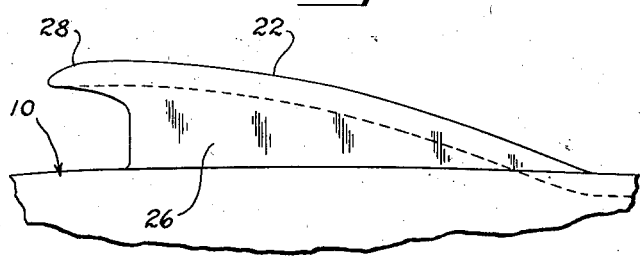
INVENTOR
Donald J. Jordan
BY Harris G. Luther
ATTORNEY.

Patented July 4, 1944

2,352,790

UNITED STATES PATENT OFFICE 2,352,790

AIR INTAKE SCOOP

Donald J. Jordan, Milford, Conn., assignor to United Aircraft Corporation, East Hartford, Conn., a corporation of Delaware Application March 29, 1941, Serial No. 385,920

3 Claims. (Cl. 244—130)

This invention relates to improvements in air intake scoops for streamlined bodies such as airplanes and has for an object the provision of an improved scoop of the character indicated which will efficiently admit air to the interior of the body over a wide range of relative speeds between the streamlined body and the surrounding air.

In various types of aircraft it has been found desirable to provide on the exterior surface of such aircraft one or more scoops for transferring air from the exterior to the interior of the aircraft. Such scoops are commonly used in connection with internal combustion engines for propelling such aircraft, to provide cooling air for the engine or engine coolant, to provide a supply of intake air for the engine, or to provide air for cooling the engine lubricant or accessories and, in some cases, for cooling the intake air itself. Such scoops are usually provided as a more or less streamlined projection on the surface or some portion of the airplane, such as the engine cowl or nacelle, with an open end directed into the relative wind past the portion of the aircraft on which they are mounted. Up to the present little attention has been paid to the shape of these scoops or projections except to make them large enough to pass the necessary volume of air and to reduce their drag as much as possible. It has been found, however, that the conventional form of air scoop actually has a relatively poor efficiency and at times fails to admit a sufficient quantity of air to the interior of the aircraft. It is though that this deficiency is probably due to a stalled condition of the air about the intake opening of the scoop and it is among the objects of this invention to provide an air intake scoop of the character indicated with an intake opening so formed that stalling of the air flowing through the intake opening does not occur even at excessively high speeds of the aircraft on which the scoop is provided.

Other objects and advantages will be more particularly referred to hereinafter or will become apparent as the description proceeds.

In the accompanying drawing, in which like reference numerals are used to designate similar parts throughout, there is illustrated a suitable constructional embodiment for the purpose of disclosing the invention. The drawing, however, is for the purpose of illustration only and is not to be taken as limiting or restricting the invention since it will be apparent to those skilled in the art that various changes in the illustrated construction may be resorted to without in any way exceeding the scope of the invention.

In the drawing,

Fig. 1 is an elevational view of a fragmentary portion of an aircraft engine cowl showing the application thereto of two air intake scoops constructed according to the invention, a portion of the cowl being broken away to show one of the scoops in section.

Fig. 2 is a plan view on an enlarged scale of an air intake scoop such as is illustrated in Fig. 1.

Fig. 3 is a front-elevational view of the air scoop illustrated in Fig. 1, and

Fig. 4 is a side-elevational view of the air scoop illustrated in Figs. 2 and 3.

Referring to the drawing in detail, the numeral 10 generally indicates a streamlined cowl enclosing an aircraft engine 12 driving a propeller 14. The cowl is provided with one or more air intake scoops, as generally indicated at 16 and 18 in Fig. 1. Each of the scoops may lead into an air duct, such as is indicated at 20 in Fig. 1, disposed within the cowl and leading to some device, such as a carburetor, oil cooler or engine accessory.

The scoop 16 comprises a curved top portion 22 integral with the side portions 24 and 26 which are joined to the surface of the cowl 10 around the open end of the duct 20. The top portion 22 extends forwardly of the side portion to provide a streamlined overhang 28 over the air entrance opening.

Stalling of the entrance opening of the usual form of scoop is thought to be due to the propagation of stratified air flow over the scoop end at high air speeds due partly to the air pressure built up in the air entrance opening of the scoop. The present arrangement by permitting a loss of air through the openings at each side of the scoop between the forward end of the top member 22 and the forward ends of the respective side members 24 and 26 prevents the building up of a stratified air flow over the scoop entrance opening and maintains the flow into the entrance opening. In somewhat different terms, the forward extension 28 of the top portion 22 may be considered as a wedge which divides the air flow at the forward end of the scoop and directs a stream of air towards the cowl surface and into the scoop opening, the splitting effect of this wedge being maintained by its extension ahead of the side walls of the scoop.

While a suitable structural embodiment for the purpose of disclosing the invention has been hereinabove described and illustrated in the accompanying drawing, it is to be understood that the invention is not limited to the particular embodiments so described and illustrated, but that various changes in the size and shape of the air scoop may be resorted to as come within the scope of the sub-joined claims.

Having now described the invention so that others skilled in the art may clearly understand the same, what it is desired to secure by Letters Patent is as follows:

1. An air scoop for directing air into an air entrance opening in a surface of a streamlined vehicle and located to the rear of the leading edge of said surface comprising, top and side scoop portions enclosing the opening, said top portion having an extension projecting forward of said side portions and forward of said opening and overlying in spaced relation a portion of the vehicle surface in front of said opening, said front extension constituting a streamlined airfoil providing a non-turbulent flow of air thereneath at the entrance between said side portions.

2. An air scoop for directing air into an air entrance opening in a surface of a streamlined vehicle and located to the rear of the leading edge of said surface comprising, integral top and side portions enclosing the opening, said side portions constituting generally parallel straight-sided streamlined airfoils terminating adjacent the front of said opening in leading edges disposed substantially normal to said surface, and said top portion having an extension projecting forward of said side portions and forward of said opening and overlying in spaced relation a portion of the vehicle surface in front of said opening, said extension constituting a streamlined airfoil providing a non-turbulent flow of air thereneath at the entrance between said side portions.

3. An air scoop for directing air into an air entrance opening in a surface of a streamlined vehicle and located to the rear of the leading edge of said surface comprising, integral top and side scoop portions enclosing the opening, said side portions being generally parallel and substantially normal to said surface and including streamlined front edges terminating adjacent the front of said opening and disposed substantially normal to said surface, and said top portion having a vertically crowned thick-walled extension projecting forward of said side portions and also forward of said opening and overlying in generally parallel spaced relation a portion of said vehicle surface in front of said opening, said front extension and said side walls constituting streamlined airfoils providing a non-turbulent flow at the scoop entrance.

DONALD J. JORDAN.